(12) United States Patent
Salter et al.

(10) Patent No.: US 9,469,244 B2
(45) Date of Patent: Oct. 18, 2016

(54) LUMINESCENT VEHICLE SEAL

(71) Applicant: Ford Global Technologies, LLC, Dearborn, MI (US)

(72) Inventors: Stuart C. Salter, White Lake, MI (US); Paul Kenneth Dellock, Northville, MI (US); David Arthur Wade, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/710,014

(22) Filed: May 12, 2015

(65) Prior Publication Data

US 2015/0246637 A1  Sep. 3, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 3/02* | (2006.01) |
| *H05B 37/02* | (2006.01) |
| *B60Q 3/00* | (2006.01) |

(52) U.S. Cl.
CPC ............. *B60Q 3/0216* (2013.01); *B60Q 3/008* (2013.01); *B60Q 3/0293* (2013.01); *H05B 37/0218* (2013.01); *H05B 37/0227* (2013.01); *Y02B 20/46* (2013.01)

(58) Field of Classification Search
CPC .. B60Q 3/008; B60Q 3/0216; B60Q 3/0293; H05B 37/0218; H05B 37/0227
USPC .......................... 362/487–488, 501, 509–510
See application file for complete search history.

(56) References Cited

U.S. PATENT DOCUMENTS

| | | | |
|---|---|---|---|
| 5,709,453 A | 1/1998 | Krent et al. | |
| 6,117,362 A | 9/2000 | Yen et al. | |
| 6,252,500 B1 * | 6/2001 | Chueh | B60Q 1/323 340/438 |
| 6,471,381 B2 | 10/2002 | Atkinson et al. | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Jason Rogers; Price Heneveld LLP (57) ABSTRACT

A lighting system for a vehicle opening is provided herein. The lighting system includes a seal disposed around a periphery of an opening in the body of a vehicle. A light source is disposed on a portion of the seal. The light source may implement a thin design, thereby helping to fit the light source into small package spaces of the vehicle. A first photoluminescent structure is configured to luminesce in response to excitation by at least a portion of the light sources.

20 Claims, 9 Drawing Sheets

(56) References Cited

U.S. PATENT DOCUMENTS

| | | | |
|---|---|---|---|
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,161,472 B2 | 1/2007 | Strumolo et al. | |
| 7,213,923 B2 | 5/2007 | Liu et al. | |
| 7,226,112 B2 * | 6/2007 | Ward | B60J 5/101 296/146.8 |
| 7,264,366 B2 | 9/2007 | Hulse | |
| 7,264,367 B2 | 9/2007 | Hulse | |
| 7,441,914 B2 | 10/2008 | Palmer et al. | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,845,836 B2 | 12/2010 | Okuda | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,071,988 B2 | 12/2011 | Lee et al. | |
| 8,075,173 B2 | 12/2011 | Shallcross et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,773,012 B2 | 7/2014 | Ryu et al. | |
| 8,846,184 B2 | 9/2014 | Agrawal et al. | |
| 8,952,341 B2 | 2/2015 | Kingsley et al. | |
| 9,057,021 B2 | 6/2015 | Kingsley et al. | |
| 9,065,447 B2 | 6/2015 | Buttolo et al. | |
| 9,299,887 B2 | 3/2016 | Lowenthal et al. | |
| 2002/0152686 A1 | 10/2002 | Whitehead | |
| 2002/0159741 A1 | 10/2002 | Graves et al. | |
| 2002/0163792 A1 | 11/2002 | Formoso | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2007/0032319 A1 | 2/2007 | Tufte | |
| 2007/0285938 A1 | 12/2007 | Palmer et al. | |
| 2009/0219730 A1 | 9/2009 | Syfert et al. | |
| 2009/0251920 A1 | 10/2009 | Kino et al. | |
| 2009/0262515 A1 | 10/2009 | Lee et al. | |
| 2011/0012062 A1 | 1/2011 | Agrawal et al. | |
| 2011/0141760 A1 | 6/2011 | Ory et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0114276 A1 | 5/2013 | Lee | |
| 2013/0335994 A1 | 12/2013 | Mulder et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 102008027128 A1 | 3/2009 |
| EP | 1793261 A1 | 6/2007 |
| EP | 2556996 A2 | 2/2013 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

LUMINESCENT VEHICLE SEAL

CROSS-REFERENCE TO RELATED APPLICATIONS

This application is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a lighting system for a vehicle opening is provided. The lighting system includes a seal disposed at least partially around a periphery of an opening in the body of a vehicle. A light source is disposed on a portion of the seal. A first photoluminescent structure is configured to luminesce in response to excitation by the light source.

According to another aspect of the present invention, a seal for a vehicle is provided. The seal includes a door contact member and a mounting member. A light source is disposed on the mounting member. A luminescent structure is configured to luminesce in response to excitation by at least a portion of the light source. A controller is configured to control an activation state of the light source.

According to yet another aspect of the present invention, a door opening for a vehicle is provided. The door opening includes a vehicle body panel having a void therein. A door seal having a door contact member and a mounting member is attached to the vehicle body panel. A plurality of light sources is disposed on the door seal. A first photoluminescent structure is disposed on the light sources. A second photoluminescent structure is disposed on a component proximate the door seal. The first and second photoluminescent structures are configured to luminesce in response to excitation by light output from at least a portion of the light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system configured to illuminate an opening of a vehicle. The lighting system may advantageously employ one or more photoluminescent structures to illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable.

Figure 1:
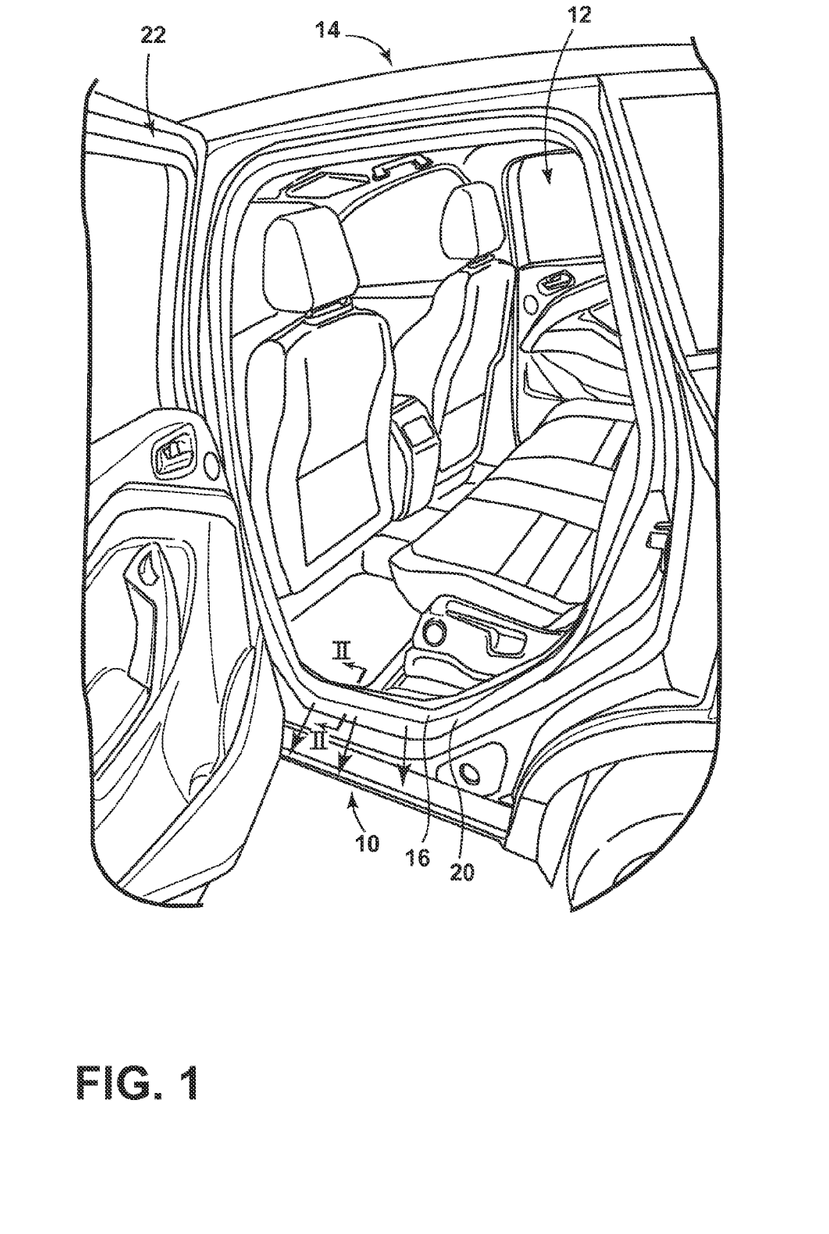
FIG. 1 illustrates a perspective view of a vehicle door opening employing an illumination system according to one embodiment.

Referring to FIG. 1, a lighting system 10 configured as an illuminated seal that may illuminate an area proximate a door opening 12 on a vehicle 14, according to one embodiment, is illustrated. As shown, a door seal 16 is attached to an outer periphery of the door opening 12. The door seal 16 is attached to a flange 18 (FIG. 2) projecting toward the door opening 12 portion from a body panel 20 of the vehicle 14 to provide a seal between a door 22 and the door opening 12 when the door 22 is placed in the closed position. The door seal 16 may be sectioned and coupled to the body panel 20 of the vehicle 14. As shown and described in greater detail below, the seal is configured to provide decorative and/or functional lighting. It should be appreciated that the door seal 16 described herein may be utilized for any vehicle such as, but not limited to, coupes, sedans, trucks, sport utility, vans, and the like. Further, it should be appreciated that any seal found elsewhere on the vehicle 14 may also be manufactured in accordance with the principles of the present invention.

Figure 2:
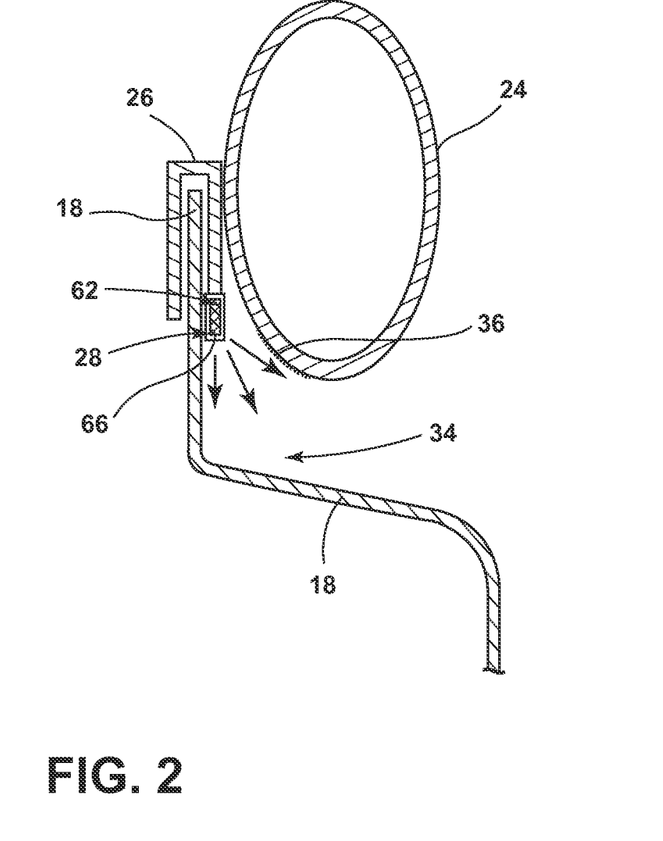
FIG. 2 is an exemplary cross section of a door seal that includes the illumination system.

Referring to FIG. 2, a cross-sectional view of the door seal 16 is shown according to one embodiment. The door seal 16 includes a door contact member 24 and a mounting member 26 that may be integrally formed with the contact member 24 or subsequently attached thereto. The mounting member 26 may be secured to the body panel 20 by any conventional means, including, but not limited to, adhesives, clips, or retainers. The door contact member 24 and mounting member 26 may be constructed from a flexible, resilient material, such as an elastomer. It should be appreciated that the door seal 16 may contain additional components or features such that the lighting system 10 described herein may be utilized on any seal within the vehicle 14.

A light source 28 may be disposed on a flexible circuit board (e.g., a copper flexible circuit) that is coupled to the door seal 16. In such an arrangement, the flexible circuit board may flex in conjunction with the seal to allow the door seal 16 to be contoured to the body panel 20. The light source 28 may be over molded, or otherwise attached, to a portion of the door seal 16, such as an exterior facing portion of the mounting member 26. According to one embodiment, the door seal 16 and the light source 28 are placed in a mold simultaneously or one after the other, followed by an overmold material 66 that is disposed over the combination of the mounting member 26 and light source 28. In embodiments where the overmold material 66 is cured under pressure, the overmold material 66 may be applied to the mounting member 26 in a partly-cured condition. In one embodiment the over molding process includes applying the overmold material 66 onto at least a part of the combination of the door seal 16 and light source 28, by spraying, brushing, dipping, printing, laminating or rolling, followed by curing the overmold material 66. Such a process results in the door seal 16 and light source 28 being coupled to one another.

A photoluminescent structure 62 may be applied or otherwise arranged on and/or proximate the light source 28. One or more light sources 28 may be disposed within the lighting system 10 and configured to emit light towards an illuminated portion 34. More specifically, light emitted from the light source 28 towards the illuminated portion 34 may be converted by the photoluminescent structure 62 and re-emitted as light having a different wavelength, typically in the visible spectrum. The light source 28 and/or photoluminescent structure 62 creates an illuminated portion 34 that is oriented relative to the body panel 20 to ensure that it can be viewed by persons located outside the vehicle 14. In order to increase the illuminated portion 34, a reflective material 36 may be disposed on a portion of the contact member 24 that is configured to direct light outwardly from the area between the contact member 24 and mounting member 26.

Figure 3A:
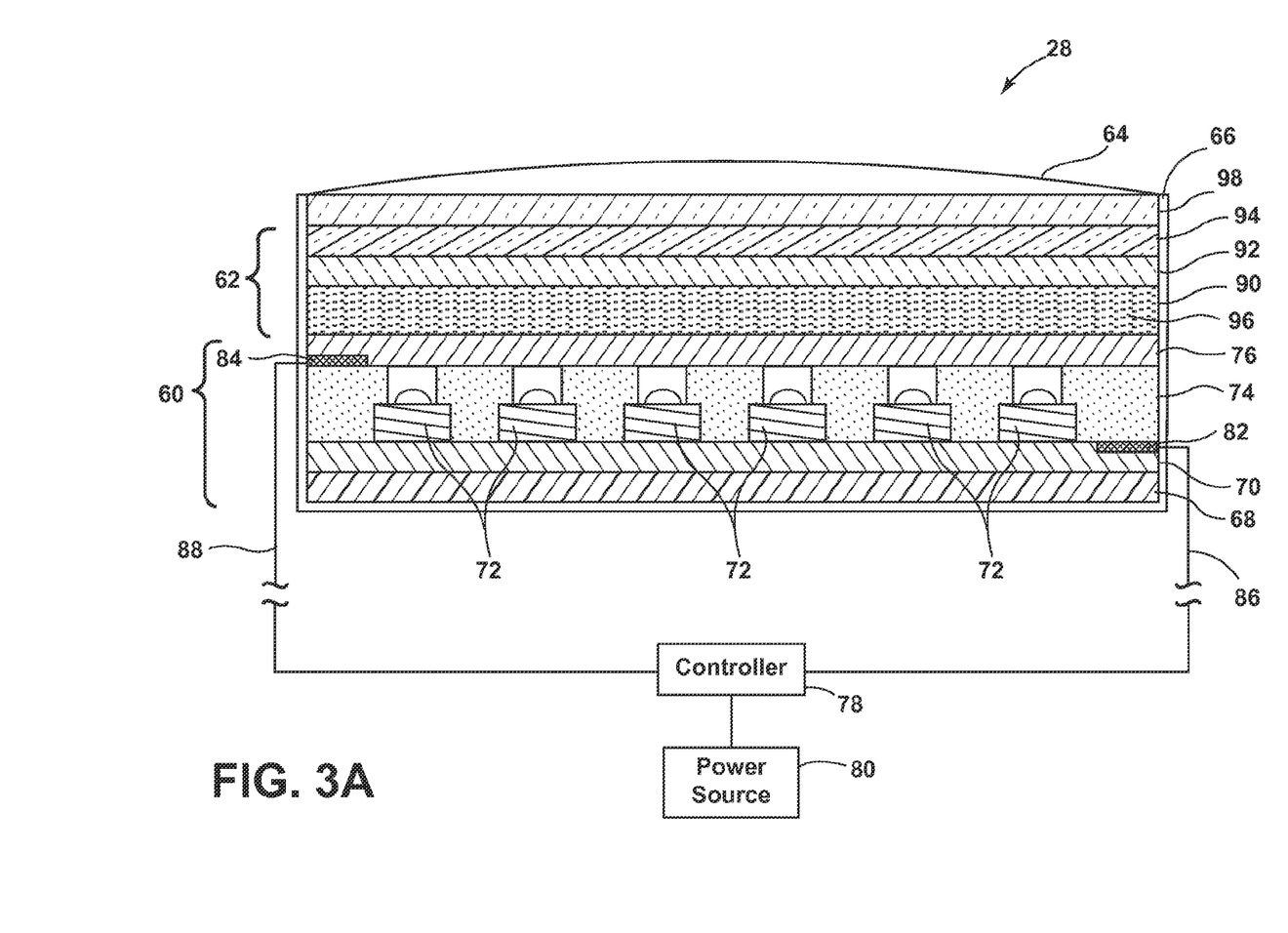
FIG. 3A is a cross-sectional view taken along line III-III of FIG. 2 illustrating a light source according to one embodiment.

Referring to FIGS. 3A-3E, a cross-sectional view of the light source 28 capable of use on a vehicle 14 with an external photoluminescent structure 62 is shown according to one embodiment. As illustrated in FIG. 3A, the light source 28 may have a stacked arrangement that includes a light-producing assembly 60, a photoluminescent structure 62, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle surface on which the light source 28 is to be received (e.g., mounting member 26). Alternatively, as a cost saving measure, the substrate 68 may directly correspond to a preexisting vehicle structure (e.g., mounting member 26, exterior panels, and/or interior panels).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars.

The LED sources 72 may be dispersed in a random or controlled fashion within the semiconductor ink 74 and may be configured to emit focused or non-focused light toward the photoluminescent structure 62. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3A, the photoluminescent structure 62 is arranged over the negative electrode 76 as a coating, layer, film or other suitable deposition. With respect to the presently illustrated embodiment, the photoluminescent structure 62 may be arranged as a multi-layered structure including an energy conversion layer 90, optional stability layer 92, and optional protection layer 94.

The energy conversion layer 90 includes at least one photoluminescent material 96 having energy converting elements with phosphorescent or fluorescent properties. For example, the photoluminescent material 96 may include organic or inorganic fluorescent dyes including rylenes, xanthenes, porphyrins, phthalocyanines. Additionally or alternatively, the photoluminescent material 96 may include phosphors from the group of Ce-doped garnets such as YAG:Ce. The energy conversion layer 90 may be prepared by dispersing the photoluminescent material 96 in a polymer matrix to form a homogenous mixture using a variety of methods. Such methods may include preparing the energy conversion layer 90 from a formulation in a liquid carrier medium and coating the energy conversion layer 90 to the negative electrode 76 or other desired substrate 68. The energy conversion layer 90 may be applied to the negative electrode 76 by painting, screen printing, flexography, spraying, slot coating, dip coating, roller coating, bar coating, and/or any other methods known in the art. Alternatively, the energy conversion layer 90 may be prepared by methods that do not use a liquid carrier medium. For example, the energy conversion layer 90 may be rendered by dispersing the photoluminescent material 96 into a solid state solution (homogenous mixture in a dry state) that may be incorporated in a polymer matrix formed by extrusion, injection seal, compression seal, calendaring, thermoforming, etc.

To protect the photoluminescent material 96 contained within the energy conversion layer 90 from photolytic and thermal degradation, the photoluminescent structure 62 may include the stability layer 92. The stability layer 92 may be configured as a separate layer optically coupled and adhered to the energy conversion layer 90 or otherwise integrated therewith. The photoluminescent structure 62 may also include the protection layer 94 optically coupled and adhered to the stability layer 92 or other layer (e.g. the energy conversion layer 90 in the absence of the stability layer 92) to protect the photoluminescent structure 62 from physical and chemical damage arising from environmental exposure. The stability layer 92 and/or the protection layer 94 may be combined with the energy conversion layer 90 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 96 is formulated to become excited upon receiving inputted light of a specific wavelength from at least a portion of the LED sources 72 of the light-producing assembly 60. As a result, the inputted light undergoes an energy conversion process and is re-emitted at a different wavelength. According to one embodiment, the photoluminescent material 96 may be formulated to convert inputted light into a longer wavelength light, otherwise known as down conversion. Alternatively, the photoluminescent material 96 may be formulated to convert inputted light into a shorter wavelength light, otherwise known as up conversion. Under either approach, light converted by the photoluminescent material 96 may be immediately outputted from the photoluminescent structure 62 or otherwise used in an energy cascade, wherein the converted light serves as inputted light to excite another formulation of photoluminescent material 96 located within the energy conversion layer 90, whereby the subsequent converted light may then be outputted from the photoluminescent structure 62 or used as inputted light, and so on. With respect to the energy conversion processes described herein, the difference in wavelength between the inputted light 100 and the converted light 102 is known as the Stokes shift and serves as the principle driving mechanism for an energy conversion process corresponding to a change in wavelength of light.

With continued reference to FIG. 3A, the viewable portion 64 is arranged over the photoluminescent structure 62. In some embodiments, the viewable portion 64 may include a plastic, silicon, or urethane material and is molded over the photoluminescent structure 62 and light-producing assembly 60. Preferably, the viewable portion 64 should be at least partially light transmissible. In this manner, the viewable portion 64 will be illuminated by the photoluminescent structure 62 whenever an energy conversion process is underway. Additionally, by over-sealing the viewable portion 64, it may also function to protect the photoluminescent structure 62 and the light-producing assembly 60. The viewable portion 64 may be arranged in a planar shape and/or an arcuate shape to enhance its viewing potential when in a luminescent state. Like the photoluminescent structure 62 and the light-producing assembly 60, the viewable portion 64 may also benefit from a thin design, thereby helping to fit the light source 28 into small package spaces of the vehicle 14.

In some embodiments, a decorative layer 98 may be disposed between the viewable portion 64 and the photoluminescent structure 62. The decorative layer 98 may include a polymeric material or other suitable material and is configured to control or modify an appearance of the viewable portion 64 of the light source 28. For example, the decorative layer 98 may be configured to confer a metallic appearance to the viewable portion 64 when the viewable portion 64 is in an unilluminated state. In other embodiments, the decorative layer 98 may be tinted any color to complement the vehicle structure on which the light source 28 is to be received. In any event, the decorative layer 98 should be at least partially light transmissible such that the photoluminescent structure 62 is not prevented from illuminating the viewable portion 64 whenever an energy conversion process is underway.

The overmold material 66 is disposed around the light-producing assembly 60 and photoluminescent structure 62. The overmold material 66 may protect the light-producing assembly 60 from a physical and chemical damage arising from environmental exposure. The overmold material 66 may have visco elasticity (i.e. having both viscosity and elasticity), a low Young's modulus, and/or a high failure strain compared with other materials so that the overmold material 66 may protect the assembly when contacted by additional components on the vehicle 14 or passengers. For example, the overmold material 66 may protect the light-producing assembly 60 from the repetitive strikes that occur when the vehicle door 22 closes against the door seal 16.

In some embodiments, the photoluminescent structure 62 may be employed separate and away from the light-producing assembly 60. For example, the photoluminescent structure 62 may be positioned on a vehicle component or surface proximate, but not in physical contact, with the light-producing assembly 60, as will be described in more detail below. It should be understood that in embodiments where the photoluminescent structure 62 is incorporated into distinct components separated from the light source 28, the light source 28 may still have the same or similar structure to the light source 28 described in FIG. 3A.

Figure 3B:
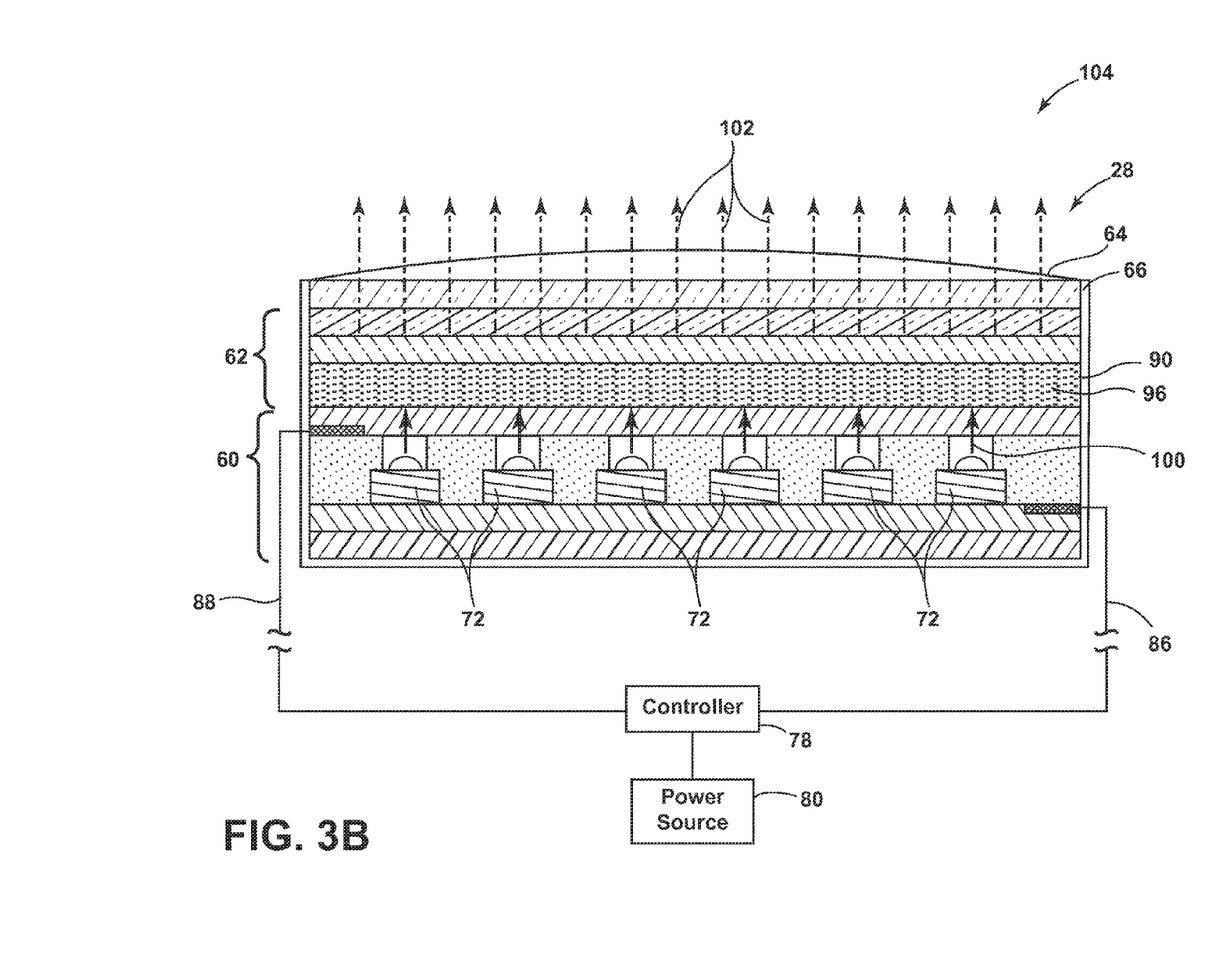
FIG. 3B is a cross-sectional view taken along line III-III of FIG. 2 further illustrating the light source, according to one embodiment.

Referring to FIG. 3B, an energy conversion process 104 for producing single color luminescence is illustrated according to one embodiment. For purposes of illustration, the energy conversion process 104 is described below using the light source 28 depicted in FIG. 3A. In this embodiment, the energy conversion layer 90 of the photoluminescent structure 62 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application. The converted visible light 102 is outputted from the light source 28 via the viewable portion 64, thereby causing the viewable portion 64 to illuminate in the desired color. In one embodiment, the energy conversion process 104 is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the viewable portion 64 offers a unique and attractive viewing experience that may be difficult to duplicate through non-photoluminescent means.

Figure 3C:
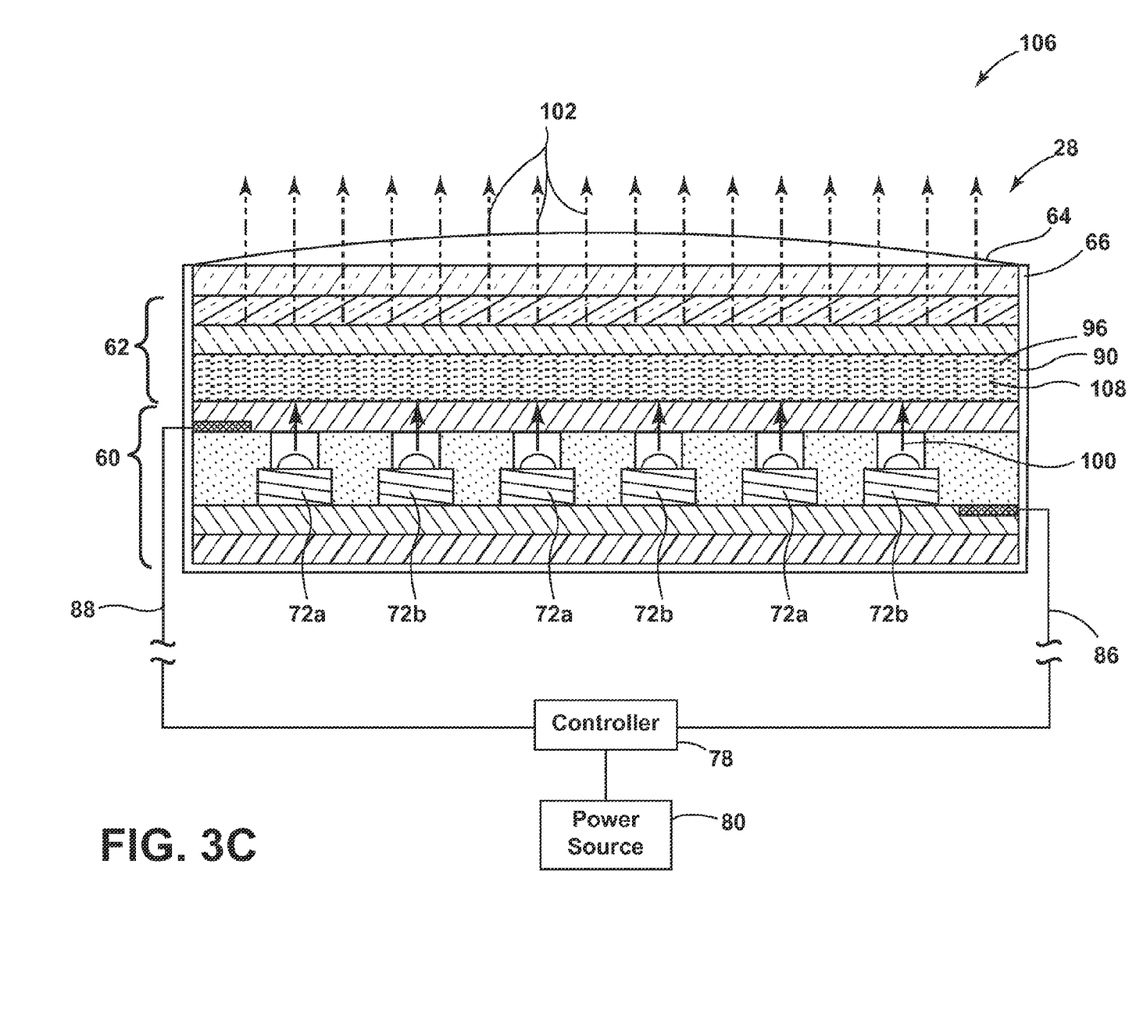
FIG. 3C is a cross-sectional view taken along line III-III of FIG. 2 illustrating an alternate light source, according to one embodiment.

Referring to FIG. 3C, a second energy conversion process 106 for generating multiple colors of light is illustrated according to one embodiment. For consistency, the second energy conversion process 106 is also described below using the light source 28 depicted in FIG. 3A. In this embodiment, the energy conversion layer 90 includes the first and second photoluminescent materials 96, 108 that are interspersed within the energy conversion layer 90. Alternatively, the photoluminescent materials 96, 108 may be isolated from each other if desired. Also, it should be appreciated that the energy conversion layer 90 may include more than two different photoluminescent materials 96, 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 96 and results in the inputted light 100 being converted into a visible light 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72a and 72b may be selectively activated using the controller 78 to cause the photoluminescent structure 62 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each light source 28 may also be proportionally varied to one another such that additional colors may be obtained. For energy conversion layers containing more than two distinct photoluminescent materials 96, a greater diversity of colors may be achieved. Contemplated colors include red, green, blue, and combinations thereof, including white, all of which may be achieved by selecting the appropriate photoluminescent materials and correctly manipulating their corresponding LED sources 72.

Figure 3D:
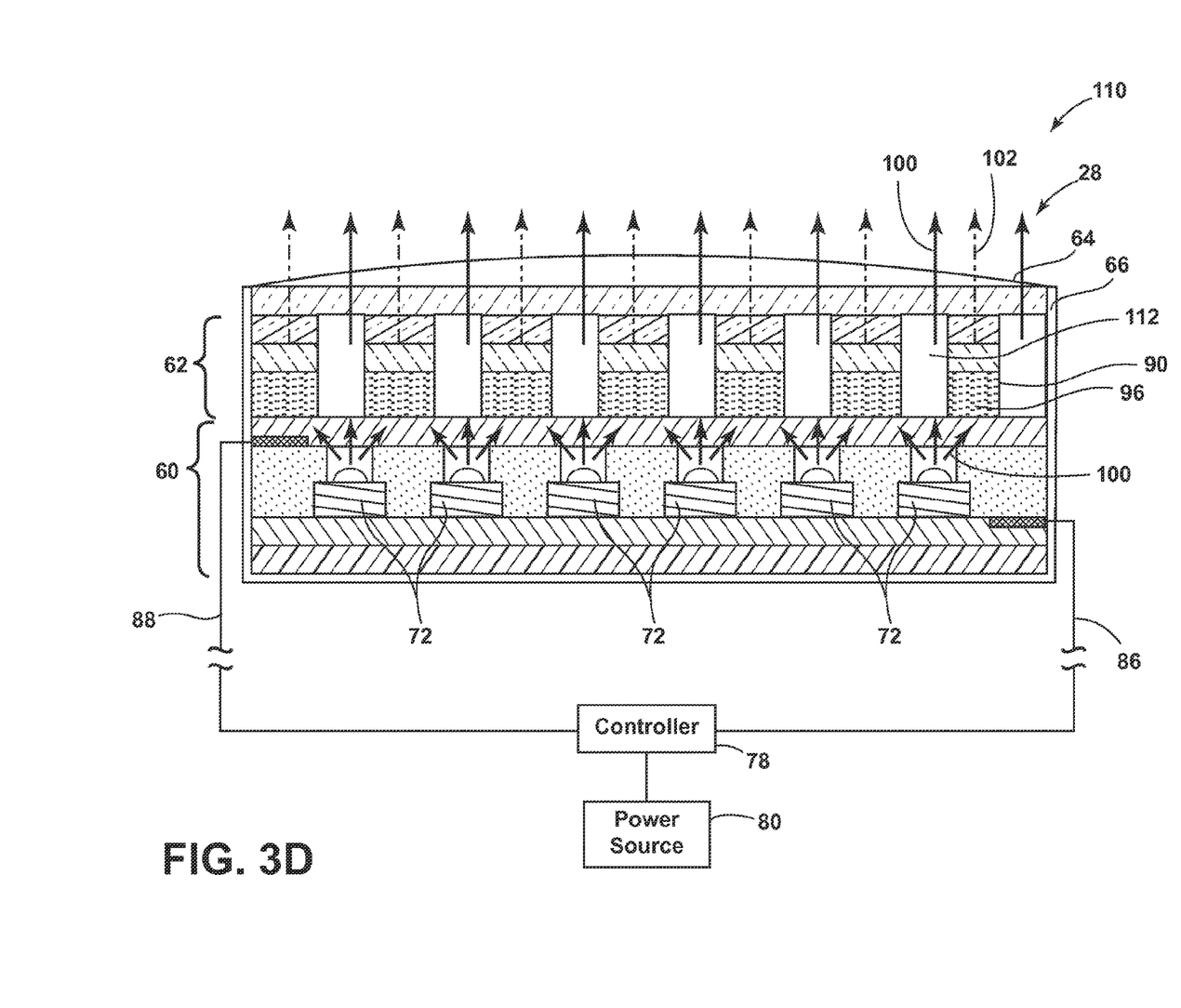
FIG. 3D is a cross-sectional view taken along line III-III of FIG. 2 illustrating a light source having a luminescent structure separated by light transmissive portions disposed on the light source, according to one embodiment.

Referring to FIG. 3D, a third energy conversion process 110 includes a light-producing assembly 60, such as the one described in reference to FIG. 3A, and a photoluminescent structure 62 disposed thereon is illustrated, according to an alternate embodiment. The photoluminescent structure 62 is configured to convert inputted light 100 received from LED sources 72 into a visible light 102 having a wavelength different than that associated with the inputted light 100. More specifically, the photoluminescent structure 62 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application.

The photoluminescent structure 62 may be applied to only a portion of the light-producing assembly 60, for example, in a stripped manner. Between the photoluminescent structures 62 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 122 disposed proximate to the light-producing assembly 60. The second photoluminescent structure 122 may be configured to luminesce in response to the inputted light 100 that is directed through the light transmissive portions 112.

Figure 3E:
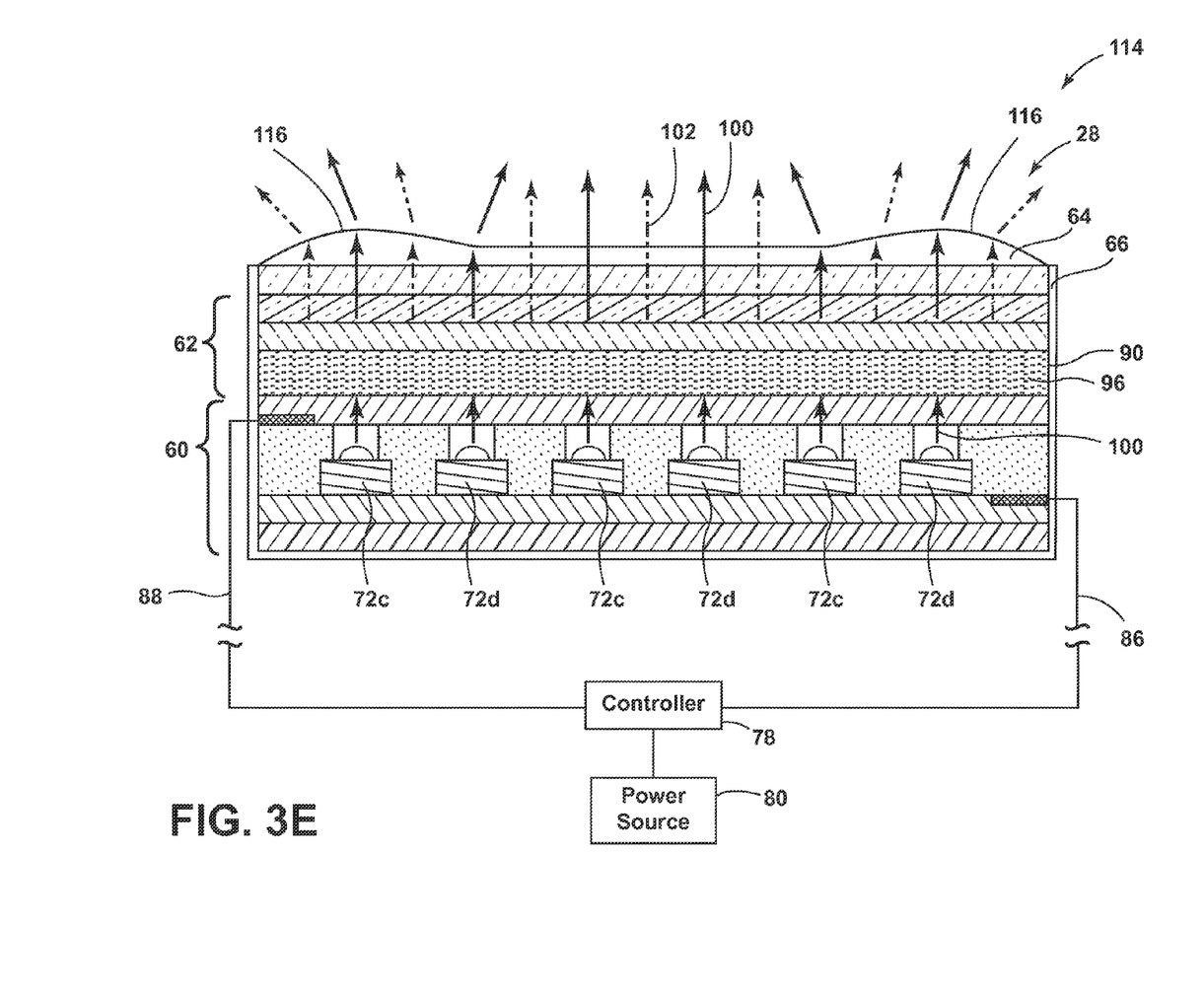
FIG. 3E is a cross-sectional view taken along line III-III of FIG. 2 illustrating an alternate light source having a luminescent structure disposed on the light source configured to convert a portion of light emitted from the light source from a first wavelength to a second wavelength, according to one embodiment.

Referring to FIG. 3E, a fourth energy conversion process 114 for generating multiple colors of light utilizing the light-producing assembly 60, such as the one described in reference to FIG. 3A, and a photoluminescent structure 62 disposed thereon is illustrated. In this embodiment, the photoluminescent structure 62 is disposed over a top portion of the light-producing assembly 60. The excitation of photoluminescent material 96 is formulated such that a portion of inputted light 100 emitted from the LED sources 72 passes through the photoluminescent structure 62 at the first wavelength (i.e., the inputted light 100 emitted from the light source 28 is not converted by the photoluminescent structure 62). The intensity of the emitted light 100 may be modified by pulse-width modulation or current control to vary the amount of inputted light 100 emitted from the LED sources 72 that passes through the photoluminescent structure 62 without converting to a second, outputted 102 wavelength. For example, if the light source 28 is configured to emit light 100 at a low level, substantially all of the inputted light 100 may be converted to outputted light 102 at a second wavelength. In this configuration, a color of light 102 corresponding to the photoluminescent structure 62 may be emitted from the light-producing assembly 60. If the light source 28 is configured to emit inputted light 100 at a high level, only a portion of the first wavelength may be converted by the photoluminescent structure 62. In this configuration, a first portion of the emitted light 100 may be converted by the photoluminescent structure 62 and a second portion of the light 100 may be emitted from the light-producing assembly 60 at the first wavelength towards additional photoluminescent structures disposed proximately to the light source 28. The additional photoluminescent structures may luminesce in response to the light 100 emitted from the light source 28.

According to one exemplary embodiment, a first portion of the LED sources 72, exemplarily shown as LED sources 72a is configured to emit an inputted light 100 having a wavelength that excites the photoluminescent material 96 within the photoluminescent structure 62 and results in the inputted light 100 being converted into a visible light 102 of a first color (e.g., white). Likewise, a second portion of the LED sources 72, exemplarily shown as LED sources 72c, is configured to emit an inputted light 100 having a wavelength that passes through the photoluminescent structure 62 and excites additional photoluminescent structures 122 disposed proximately to the lighting system 10 thereby illuminating in a second color. The first and second colors may be visually distinguishable from one another. In this manner, LED sources 72a and 72c may be selectively activated using the controller 78 to cause the lighting system 10 to luminesce in a variety of colors.

The light-producing assembly 60 may also include optics 116 that are disposed proximately to the overmold material 66 and/or integrally formed with the overmold material 66 during the over molding process. The optics 116 are configured to direct light 100 emitted from the LED sources 72a, 72c and the light 102 emitted from the photoluminescent structure 62 towards pre-defined locations. For example, light 100 emitted from the LED sources 72a, 72c and the photoluminescent structure 62 may be directed and/or focused towards a desired feature and/or location proximate to the light source 28.

Figure 4:
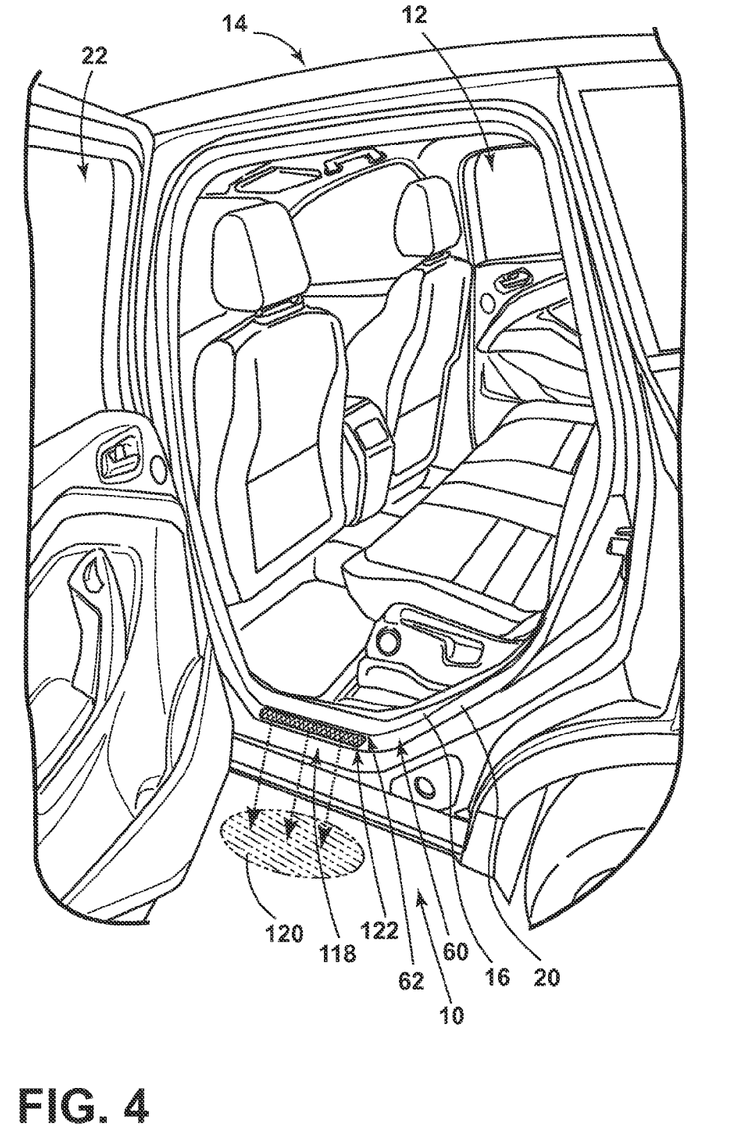
FIG. 4 illustrates a perspective view of a vehicle door opening employing an illumination system further including luminescent features proximately located to the light source.

Referring to FIG. 4, a first lighting system 10 having a first photoluminescent structure 62 is disposed on the light-producing assembly 60 and a second photoluminescent structure 122 is disposed on a step-in portion 118 of the door opening 12. The step-in portion 118 of the door opening 12 may be an area on a body panel 20 of the vehicle 14 proximate the bottom portion of the door opening 12. While entering or exiting the vehicle 14, a passenger may place their foot on part of the step-in portion 118. Accordingly, the step-in portion 118 may have a non-skid material disposed thereon. The non-skid material may be configured to assist an occupant during ingress and egress from the vehicle 14 and may be made of any material known in the art, including, but not limited to, a polymeric or elastomeric material. The non-skid material, or step-in portion 118, may further contain indicia thereon. The indicia may be a logo, an emblem, a welcome message, etc.

The light source 28 is configured to emit light towards the step-in portion 118. As described above, a portion of the inputted light 100 is converted by the photoluminescent structure 62 and a second portion is converted by the second photoluminescent structure 122 within the step-in portion 118 to an outputted light 102 of a different wavelength. The outputted light 102 may be used to illuminate the door opening 12, illuminate the indicia, or illuminate an area of the ground 120 proximate the step-in portion 118 of the door opening 12.

The light-producing assembly may also include varying types and concentrations of LED sources 72 along the light-producing assembly 60. A first portion of the light-producing assembly 60 may include a first LED source 72 that is configured to emit an inputted light 100 having an emission wavelength in a first color (e.g., white) spectrum. Likewise, a second portion of the light-producing assembly 60 may include second LED source 72 that is configured to emit an inputted light 100 having an emission wavelength in a second color (e.g., red) spectrum. The first and second portions of the light-producing assembly 60 may be separated by insulative, or non-conductive, barriers from proximately disposed portions through any means known in the art such that each portion may be illuminated independently of any other portion. Further, each portion disposed within the light-producing assembly 60 may include a respective bus bar 82, 84, coupled to the controller 78 and configured to illuminate each respective portion.

Preferably, the first and second colors are visually distinguishable from one another. In this manner, LED sources 72 may be selectively activated using the controller 78 to cause the LED sources 72 to illuminate in a variety of colors. For example, the controller 78 may activate only the first LED source 72 to exclusively illuminate a portion of the light-producing assembly 60 in the first color proximately located to the step-in portion 118. Alternatively, the controller 78 may activate only the second LED source 72 to exclusively illuminate a portion of the light-producing assembly 60 in the second color disposed on the top portion of the seal 16. Thus, varying portions of the seal 16 may illuminate in a plurality of colors. It should be appreciated that the light-producing assembly 60 may include any number of portions having varying LED sources 72 that may illuminate in any desired color. Moreover, it should also be appreciated that the portions having varying LED sources 72 may be orientated in any practicable manner and need not be disposed adjacently.

As described above, a photoluminescent structure 62 may be disposed on a portion of the light-producing assembly 60. If desired, any of the LED sources 72 may be utilized for exciting any photoluminescent material 92 disposed proximately to and/or on the light source 28.

The semiconductor ink 74 may also contain various concentrations of LED sources 72 such that the density of the LED sources 72, or number of LED sources 72 per unit area, may be adjusted for various lighting applications. In some embodiments, the density of LED sources 72 may vary across the length of the light source 28. For example, a central portion of the light-producing assembly 60 may have a greater density of LED sources 72 than peripheral portions, or vice versa. In such embodiments, the light source 28 may appear brighter or have a greater luminance in order to preferentially illuminate pre-defined locations. In other embodiments, the density of LED sources 72 may increase or decrease with increasing distance from a preselected point. For example, the step-in portion 118 of the vehicle opening 12 may include the highest concentration of LED sources 72 such that the proximately disposed area may be fully illuminated. Other portions of the periphery of the door opening 12 may include smaller concentrations of LED sources 72 such that the area having smaller concentrations of LED sources 72 may provide ambient lighting. In some embodiments, the LED sources 72 and semiconductor ink 74 may be sourced from Nth Degree Technologies Worldwide Inc.

It is contemplated that the use of a second photoluminescent structure 122 proximate the lighting system 10 may be disposed at any desired location and is not limited to the step-in portion 118. For example, a second lighting system 10 including a light source 28 and a second photoluminescent structure 122 may be disposed proximate a top portion of the door opening 12 to provide additional lighting during ingress and egress of the vehicle 14. Additionally, the second photoluminescent structure 122 may also provide safety benefits, such as notifying an incoming occupant of the dimensions of the door opening 12.

Alternatively, the door contact member 24 and/or mounting member 26 may be formed from a transparent or translucent material. According to one embodiment, the door contact member 24 is made of a translucent, flexible material that is backlit by the light source 28 when the illumination system 10 is illuminated. It should be appreciated that the door seal may also be of any color. For example, the seal 16 may be translucent and of a matching color to surrounding body panels 20.

Alternatively still, it should also be appreciated that the photoluminescent structure 62 described herein may be applied to the translucent and/or transparent door seal 16 while the light source 28 is disposed on the mounting member 26. In such a configuration, the light source 28 may emit inputted light 100 through the door contacting member 24 and excite the photoluminescent material 96 on the opposing side of the seal 16. When the photoluminescent material 96 is emits outputted light 102, a portion of the seal 16 may illuminate in a substantially uniform manner.

Figure 5:
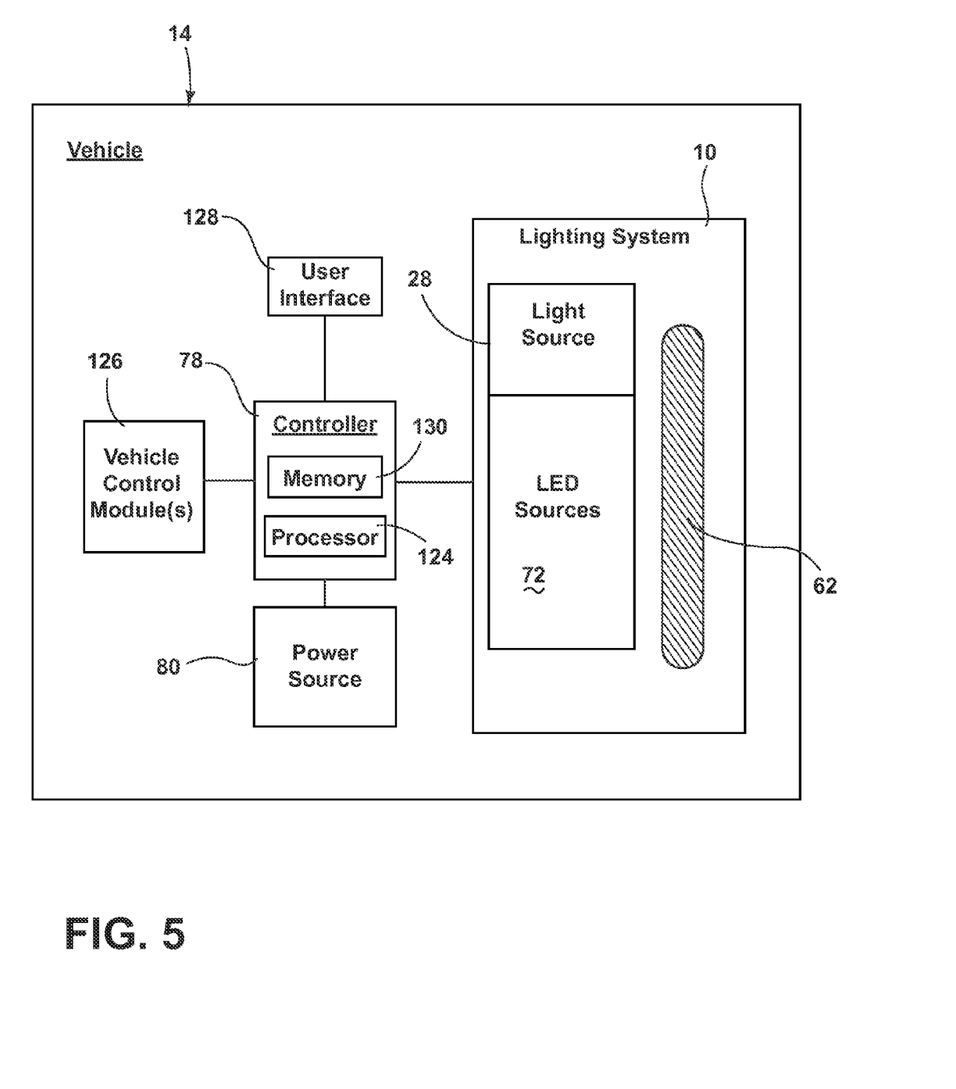
FIG. 5 is block diagram of the vehicle and the illuminated lighting system.

Referring to FIG. 5, a block diagram of a vehicle 14 is generally shown in which an illuminated seal lighting system 10 is implemented. The illuminated seal lighting system 10 includes a controller 78 in communication with the light source 28. The controller 78 may include memory 130 having instructions contained therein that are executed by a processor 124 of the controller 78. The controller 78 may provide electrical power to the light source 28, or to a respective bus bar 82, 84, via a power source 80 located onboard the vehicle 14. In addition, the controller 78 may be configured to control the light emitted 100 from each light source 28 based on feedback received from one or more vehicle control modules 126 such as, but not limited to, a body control module, engine control module, steering control module, brake control module, the like, or a combination thereof. By controlling the light emitted 100 the light source 28, the illuminated seal lighting system 10 may illuminate in a variety of colors and/or patterns to provide an aesthetic appearance, or may provide vehicle 14 information to an intended observer. For example, when a vehicle door 22 is ajar, the door seal 16, or a component proximate the door seal 16, may illuminate an area around the door opening 12.

In operation, the photoluminescent structure 62 may exhibit a constant unicolor or multicolor illumination. For example, the controller 78 may prompt the light source 28 to emit only the first wavelength of light 100 via the LED sources 72 to cause a photoluminescent material 96 to illuminate in the first color (e.g., white). Alternatively, the controller 78 may prompt the light source 28 to emit only the second wavelength of light 102 via the LED sources 72 to cause the photoluminescent material 108 to illuminate in the second color (e.g., red). Alternatively still, the controller 78 may prompt the light source 28 to simultaneously emit the first and second wavelengths of light 100, 102 to cause the photoluminescent materials 96, 108 to illuminate in a third color (e.g. pinkish) defined by an additive light mixture of the first and second colors. Moreover, additional photoluminescent portions may be added to the lighting system 10 that converts the inputted LIGHT 100 from the light source 28 to a third and/or fourth wavelength. The third and fourth wavelengths may combine to form a substantially white light proximate the lighting system 10.

In another embodiment, the lighting system 10 may include a user interface 128. The user interface 128 may be configured such that a user may control the wavelength of light 100 that is emitted by the LED sources 72 and/or the LED sources 72 that are illuminated. Such a configuration may allow a user to control which features are illuminated (e.g., step-in portion 118). The user interface 128 may be disposed within the vehicle 14 cabin or on any surface that is accessible to the user during utilization of the lighting system 10 described herein. The user interface 128 may use any type of control known in the art, such as, but not limited to, proximity sensors.

In another embodiment, the photoluminescent structure 62 may exhibit periodic unicolor or multicolor illumination. For example, the controller 78 may prompt the light source 28 to periodically emit only the first wavelength of light 100 via the LED sources 72 to cause the photoluminescent structure 62 to periodically illuminate in the first color. Alternatively, the controller 78 may prompt the light source 28 to periodically emit only the second wavelength 100 of light 100 via LED sources 72 to cause the photoluminescent portion to periodically illuminate in the second color. Alternatively, the controller 78 may prompt the light source 28 to simultaneously and periodically emit the first and second wavelengths of light 100 to cause the photoluminescent structure 62 to periodically illuminate in a third color defined by an additive light mixture of the first and second colors. Alternatively still, the controller 78 may prompt the light source 28 to alternate between periodically emitting the first and second wavelengths of light to cause the photoluminescent structure 62 to periodically illuminate by alternating between the first and second colors. The controller 78 may prompt the light source 28 to periodically emit the first and/or second wavelengths of light at a regular time interval and/or an irregular time interval.

With respect to the above examples, the controller 78 may modify the intensity of the emitted first and second wavelengths of light by pulse-width modulation or current control. In some embodiments, the controller 78 may be configured to adjust a color of the emitted light by sending control signals to adjust an intensity or energy output level of the light source 28. For example, if the light source 28 is configured to emit the inputted light 100 at a low level, substantially all of the inputted light 100 may be converted to the outputted light 102. In this configuration, a color of light corresponding to the outputted light 102 may correspond to the color of the emitted light from the lighting system 10. If the light source 28 is configured to output the inputted light 100 at a high level, only a portion of the inputted light 100 may be converted to the outputted light 102. In this configuration, a color of light corresponding to mixture of the inputted light 100 and the outputted light 102 may be output as the emitted light. In this way, each of the controllers 78 may control an output color of the emitted light.

Though a low level and a high level of intensity are discussed in reference to the inputted light 100, it shall be understood that the intensity of the inputted light 100 may be varied among a variety of intensity levels to adjust a hue of the color corresponding to the emitted light 100, 102 from the lighting system 10. As described herein, the color of the outputted light 102 may be significantly dependent on the particular photoluminescent materials 96 utilized in the photoluminescent structure 62. Additionally, a conversion capacity of the photoluminescent structure 62 may be significantly dependent on a concentration of the photoluminescent material 96 utilized in the photoluminescent structure 62. By adjusting the range of intensities of the inputted light 100 from the light source 28, the concentration, types, and proportions of the photoluminescent materials 96 in the photoluminescent structure 62 discussed herein may be operable to generate a range of color hues of the emitted light by blending the inputted light 100 with the outputted light 102.

Accordingly, an illumination system for a door seal has been advantageously provided herein. The door seal retains its protective properties while providing luminescent light having both functional and decorative characteristics.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting system for a vehicle opening, comprising:
   a seal disposed at least partially around a periphery of an opening in a body of a vehicle;
   a light source disposed on a portion of the seal between a body panel and a door contact member of the seal;
   a first photoluminescent structure configured to luminesce in response to excitation by the light source; and
   a reflective material disposed on an inner surface of the door contact member and configured to direct light towards the body panel.

2. The lighting system for a vehicle opening of claim 1, wherein the light source is configured as a printed LED.

3. The lighting system for a vehicle opening of claim 2, wherein the photoluminescent structure comprises at least one photoluminescent material configured to down convert an inputted light received from at least a portion of the light sources into a visible light that is outputted to a viewable portion.

4. The lighting system for a vehicle opening of claim 3, wherein the inputted light comprises one of a blue light, violet light, and a UV light.

5. The lighting system for a vehicle opening of claim 1, further comprising:
   a second photoluminescent structure separated from and disposed proximate the seal.

6. The lighting system for a vehicle opening of claim 1, further comprising a controller for controlling an activation state of the light source in response to at least one vehicle-related condition.

7. The lighting system for a vehicle opening of claim 6, wherein the controller determines at least one of a light emission intensity and a light emission duration of the light source.

8. A seal for a vehicle, comprising:
   a door contact member of the vehicle and a mounting member configured to engage the door contact member;
   a light source disposed on the mounting member;
   a luminescent structure configured to luminesce in response to excitation by the light source;
   a controller configured to control an activation state of the light source; and
   a user interface operably coupled with the controller.

9. The seal for a vehicle of claim 8, wherein the light source comprises a printed LED.

10. The seal for a vehicle of claim 9, wherein the luminescent structure comprises at least one luminescent material configured to convert an inputted light received from the LED source into a visible light that is outputted to a viewable portion.

11. The seal for a vehicle of claim 10, wherein the inputted light comprises one of a blue light, violet light, and a UV light.

12. The seal for a vehicle of claim 8, wherein a plurality of luminescent structures are separated by a plurality of light transmissive portions such that a first portion of light emitted from the light source is converted to a second wavelength and a second portion of light emitted from the light source passes through a light transmissive portion.

13. The seal for a vehicle of claim 8, wherein the controller determines at least one of a light emission intensity and a light emission duration of the light source.

14. A door opening for a vehicle, comprising:
   a door seal having a door contact member and a mounting member attached to vehicle body panel;
   a light source disposed on the door seal;
   a first photoluminescent structure disposed on the light source; and
   a second photoluminescent structure disposed on a component separated from the door seal, wherein the first and second photoluminescent structures are configured to luminesce in response to excitation by the light source.

15. The door opening for a vehicle of claim 14, wherein the light sources comprise printed LEDs.

16. The door opening for a vehicle of claim 15, wherein the first and second photoluminescent structures each comprise at least one photoluminescent material configured to down convert an inputted light received from at least a portion of the light source into a visible light that is outputted to a viewable portion.

17. The door opening for a vehicle of claim 16, wherein the inputted light comprises one of a blue light, violet light, and a UV light.

18. The door opening for a vehicle of claim 14, wherein the first photoluminescent structure illuminates in a first color and the second photoluminescent structure illuminates in a second color.

19. The door opening for a vehicle of claim 14, further comprising a controller for controlling an activation state of the light source in response to at least one vehicle-related condition.

20. The door opening for a vehicle of claim 19, wherein the controller determines at least one of a light emission intensity and a light emission duration of the light source.

\* \* \* \* \*